Feb. 19, 1952 D. G. C. HARE 2,585,932

DEVICE FOR REDUCING NOISE IN MAGNETIC RECORDING SYSTEMS

Filed July 29, 1948

INVENTOR
DONALD G.C. HARE
BY
Norman [signature]
ATTORNEY

Patented Feb. 19, 1952

2,585,932

UNITED STATES PATENT OFFICE 2,585,932

DEVICE FOR REDUCING NOISE IN MAGNETIC RECORDING SYSTEMS

Donald G. C. Hare, Stamford, Conn., assignor to Magnetic Equipment, Inc., Greenwich, Conn., a corporation of Delaware Application July 29, 1948, Serial No. 41,221

2 Claims. (Cl. 179—100.2)

The present invention relates to magnetic sound recording and reproducing systems wherein signals are recorded upon and picked up from a traveling paramagnetic medium such as wire or tape.

Irrespective of whether the longitudinal or the vertical method of recording and reproducing is employed in magnetic sound systems and irrespective of whether the recording medium is wire or tape, the carrier, both during recording and during playback, engages the soft iron cores forming elements of the magnetic circuits of the transducing devices. This continual frictional contact between parts of the cores and the relatively rapidly traveling carrier is a source of noise and hence interferes with the purity of the reproduced signal. This is a disadvantage which is present in more or less degree in all magnetic sound recording systems now in use.

It is an object of the present invention, therefore, to provide a method of, and means for, reducing or eliminating the noise introduced by the passage of the carrier over the cores of the transducing devices in magnetic sound recording and reproducing systems.

It is a further object of the invention to provide a construction of transducing device for magnetic sound systems that offers minimum frictional resistance to the travel of the recording medium and yet does not sacrifice efficiency in recording or in reproduction.

These objects of the invention are attained by providing a very thin layer of anti-friction material on the surfaces of a transducing device that are contacted by the carrier. This very thin layer or film may be a plating of material of low retentivity, such as chromium, on the pole faces of the cores or the film may be of material of low permeability such as quartz in which case it could be so deposited as to bridge the gap, as well as cover the carrier engaging portions of the pole faces.

For a better understanding of the invention reference may be had to the accompanying drawings of which:

Figure 1:
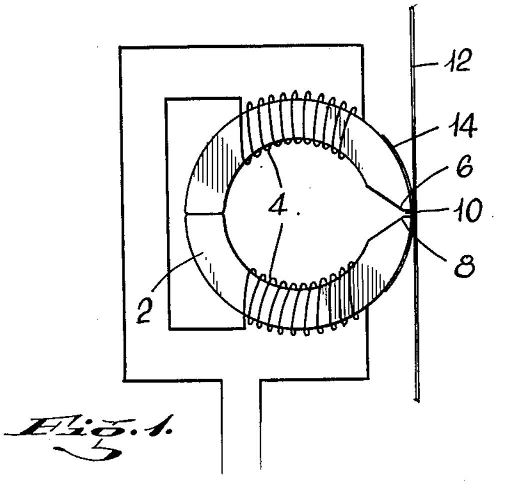
Fig. 1 is a diagrammatic top plan view of a magnetic sound transducing device embodying the invention and adapted for use in the longitudinal method of magnetic recording or reproduction.
Figure 2:
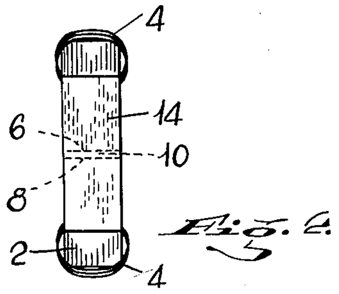
Fig. 2 is a view of the device of Fig. 1 taken from the right of Fig. 1, the tape being omitted for clarity.

In Figs. 1 and 2 a magnetic sound transducing device embodying the invention is shown as comprising a laminated core 2 of soft iron having windings 4 thereon. The core, in the construction illustrated, is formed of two sections, each having one winding thereon. The pole faces 6 and 8 of the core are separated by a gap 10 which is bridged by magnetic tape 12, the tape completing the magnetic circuit of the device. In the particular embodiment of the invention illustrated in Figs. 1 and 2, a very thin film 14 of material that is wear-resistant and of low permeability covers the pole faces 6 and 8 and bridges the gap therebetween. The film prevents physical contact of the tape 12 with the soft iron core 2 and hence eliminates noise incident to the frictional engagement of the tape with the core. The film 14 may be a layer of quartz of say one micron or less thick. A layer of such thickness will not interfere with adjustment of the gap width nor will it increase substantially the effective width of the gap.

Instead of providing a film or layer that spans the gap, the pole faces could be plated with a very thin layer of material of low magnetic retentivity such as chromium or beryllium. Such an arrangement is illustrated in Fig. 3 to which reference may now be had.

Figure 3:
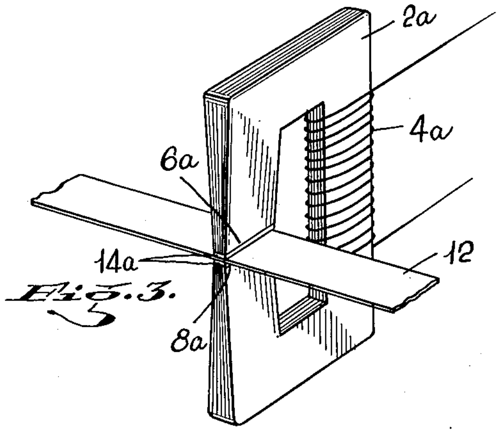
Fig. 3 is a perspective diagrammatic view illustrating the invention as embodied in a transducing device for use in the vertical method of magnetic recording on or reproducing from magnetic tape.

In Fig. 3 wherein the invention is illustrated with reference to the vertical system of recording on magnetic tape a transducing device is shown as comprising a laminated core 2a having a winding 4a thereon. The pole faces 6a and 8a are positioned at opposite sides of the tape 12a and are provided with an anti-friction surface plating 14a of material of low magnetic retentivity. The layers 14a, like film 14 of Figs. 1 and 2, presents smooth wear-resistant and anti-friction surfaces to the tape with consequent reduction in noise as compared to conventional practice.

Figure 4:
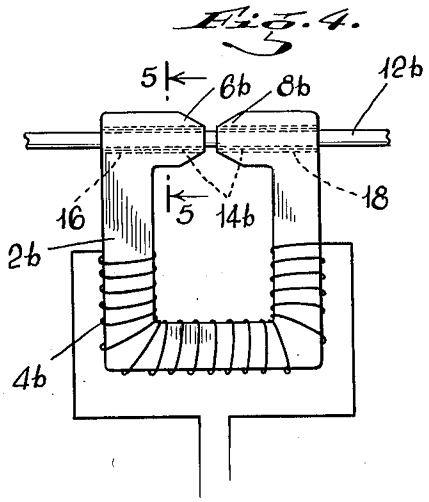
Fig. 4 illustrates the invention as embodied in a magnetic sound transducing device for use with magnetic wire.
Figure 5:
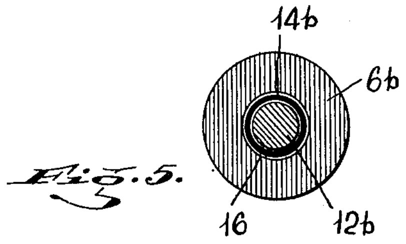
Fig. 5 is an enlarged sectional view taken on the line 5—5 of Fig. 4.

In Fig. 4 a transducing device of the type used when wire is the signal track carrier is shown as comprising a core 2b having a winding 4b thereon and opposing pole faces 6b and 8b having aligned passages 16 and 18 therethrough for the wire 12b. As shown best in Fig. 5 the surface of the aligned passages 16 and 18 in the poles 6b and 8b through which the wire passes are coated with a thin layer 14b of chromium, beryllium or the like for reducing the friction between the wire and the pole pieces of the core.

It will be apparent from the foregoing description, that the invention provides a simple method of eliminating a prime source of noise in magnetic sound systems, which method comprises the interposition of a thin layer or film of wear-resistant material between the pole faces of a magnetic transducing device and the signal carrier. The film or layer may or may not bridge the gap between the pole faces. It may be formed before or after assembly of the elements of the head and may be incorporated in playback as well as in recording heads. Because of the extreme thinness of the layer, adjustment of the width of the gap, even when the film bridges the gap, is entirely feasible. Obviously, the invention is not limited to the specific constructions illustrated as the principle thereof could be employed irrespective of the particular construction of the transducing device.

The following is claimed:

1. A transducing device for magnetic sound recording and reproducing systems comprising a core having pole faces separated by a gap for flux interlinkage with a magnetic signal carrier and a permanent anti-friction film of material of low magnetic permeability on the record contacting surfaces of the pole faces and bridging the gap therebetween.

2. A transducing device for magnetic sound recording and reproducing systems which comprises a coil carrying core having a thin film of quartz over the record contacting surfaces of its pole faces and spanning the gap therebetween.

DONALD G. C. HARE.

REFERENCES CITED

The following references are of record in the file of this patent:

UNITED STATES PATENTS

| Number | Name | Date |
|---|---|---|
| 2,263,485 | Clopton | Nov. 18, 1941 |
| 2,277,305 | Clopton | Mar. 4, 1942 |
| 2,426,838 | Miller | Sept. 2, 1947 |
| 2,431,541 | Camras | Nov. 25, 1947 |
| 2,493,742 | Begun | Jan. 10, 1950 |

FOREIGN PATENTS

| Number | Country | Date |
|---|---|---|
| 264,246 | Italy | Apr. 22, 1929 |
| 429,987 | Great Britain | June 11, 1935 |
| 585,259 | Germany | Sept. 30, 1933 |

OTHER REFERENCES

S. M. P. E. Journal, Nov. 1948, pages 468–469.